United States Patent [19]

Torii et al.

[11] Patent Number: 4,906,121
[45] Date of Patent: Mar. 6, 1990

[54] CABLE GUIDING APPARATUS FOR INDUSTRIAL ROBOT

[75] Inventors: Nobutoshi Torii, Hachioji; Ryo Nihei, Musashino; Hitoshi Mizuno, Hino, all of Japan

[73] Assignee: Fanuc Ltd., Yamanashi, Japan

[21] Appl. No.: 93,021

[22] PCT Filed: Dec. 11, 1986

[86] PCT No.: PCT/JP86/00627
§ 371 Date: Aug. 5, 1987
§ 102(e) Date: Aug. 5, 1987

[87] PCT Pub. No.: WO87/03529
PCT Pub. Date: Jun. 18, 1987

[30] Foreign Application Priority Data
Dec. 11, 1985 [JP] Japan .................. 60-278408

[51] Int. Cl.4 .................................... F16C 11/00
[52] U.S. Cl. ............................ 403/78; 403/113; 403/164; 901/28
[58] Field of Search .............. 403/164, 78, 79, 68, 403/113, 112, 116, 119, 161, 162; 901/28

[56] References Cited

U.S. PATENT DOCUMENTS

| 1,551,332 | 8/1925 | Schramm | 403/78 X |
| 1,822,260 | 9/1931 | Adams | 403/164 X |
| 2,826,440 | 3/1958 | Robboy | 403/113 |
| 3,322,886 | 5/1967 | Warshawsky | 403/161 X |
| 3,593,952 | 7/1971 | Smith | 403/113 X |
| 4,659,279 | 4/1987 | Akeel et al. | 901/28 X |
| 4,700,017 | 10/1987 | Morand | 403/113 X |

FOREIGN PATENT DOCUMENTS 2590337 5/1987 France ................ 901/28
8707450 3/1987 Japan .

Primary Examiner—Randolph A. Reese
Assistant Examiner—Peter M. Cuomo
Attorney, Agent, or Firm—Staas & Halsey

[57] ABSTRACT

A cable arranging device for an industrial robot has a cylindrical support casing (2), a swing casing (3) supported on the support casing (2) and swingable about the axis of a swing shaft, and cables (5) interconnecting the swing casing (3) and the support casing (2). One end of a substantially C-shaped cable guide (4) is pivotally supported in the swing casing on the axis of the swing shaft, the other end of the cable guide is pivotally supported in the support casing on the axis of the swing shaft. Spaces for allowing the cable guide (4) to swing therein through a prescribed angle are defined respectively in the swing casing (3) and the support casing (2).

11 Claims, 2 Drawing Sheets

4,906,121

CABLE GUIDING APPARATUS FOR INDUSTRIAL ROBOT

BACKGROUND OF THE INVENTION

Cross-Reference to Related Applications

The subject matter of the present application is related to that of U.S. application Ser. No. 117,195 filed Oct. 5, 1987.

The present invention relates to a cable guiding apparatus for an industrial robot, and more particularly to a cable guiding apparatus for grinding a cable disposed between a support casing and a swing casing of an industrial robot having a swing shaft.

BACKGROUND ART

Industrial robots are either fixed to a floor or mounted on a base movable along a floor. FIG. 4 is a side elevational view showing by way of example an idustrial robot having a base fixed to a floor.

Designated at 1 is a base fixed to a floor at an installation site. A support casing 2, which is fixed with respect to a central axis, is mounted on the base 1, and a swing casing 3 which is movable with respect to the central axis is mounted on the support casing 2, the swing casing 3 being rotatable through a certain angular range (2).

A support 5' by which a first arm 4' is swingably supported is mounted on the swing casing 3, and a second arm 6' having a wrist 7' is swingably mounted on an upper end of the first arm 4'.

In such an industrial robot, power and signal cables are led from the exterior into the swing casing 3 which supports the first arm 4' and others. These cables extend through the base 1 into the support casing 2 and then into the swing casing 3. Within the swing casing 3, the cables are moved in a direction of swinging movement of the swing casing 3 as the swing casing 3 swings. Therefore, the cables in the support casing 2 should be long enough not to obstruct operation operation of the swing casing 3, and the casings accommodated in the support casing 2 need to be treated in a prescribed manner.

According to the conventional cable arrangement, a special consideration has been required to prevent the cables in the support casing 2 from contacting the internal members of the swing casing 3 and the support casing 2 upon swinging movement of the swing casing 3 so that the surfaces of the cables will not be damaged. Since the cables are normally treated to meet such a requirement simply by increasing the thickness of their coverings, the cables themselves may be subjected to undue bending stresses dependent on the angle of swinging movement, resuling in a reduced service life of the cables.

SUMMARY OF THE INVENTION

The present invention has been made in view of the aforesaid problems. It is an object of the present invention to provide a cable guiding apparatus for an industrial robot, in which cables introduced through a support casing into a swing casing will not be damaged at their surfaces and will not be subjected to undue bending stresses.

According to the present invention, there is provided a cable guiding apparatus for an industrial robot, for guiding cables interconnecting a swing shaft swingable through a prescribed angle and a support supporting the swing shaft, comprising a cylindrical support casing, a swing casing rotatably supported on said support casing and swingable around said swing shaft, a substantially C-shaped cable guide having one end pivotally supported in said swing casing on the axis of said swing shaft and an opposite end pivotally supported in said support casing on the axis of said swing shaft, and openings defined in said swing casing and said support casing, respectively, for allowing said cable guide to swing therein through a prescribed angle.

When the swing casing swings, the cable guide supporting the cables is freely swung in the openings in the swing and support casings according to stresses applied to the cables. Therefore, the cables are bent to an arcuate shape having a large curvature to distribute applied bending stresses to a wide area.

DETAILED DESCRIPTION OF THE PREFERRED EMBODIMENTS

A preferred embodiment of the present invention will hereinafter be described in specific detail with reference to the drawings.

Figure 1:
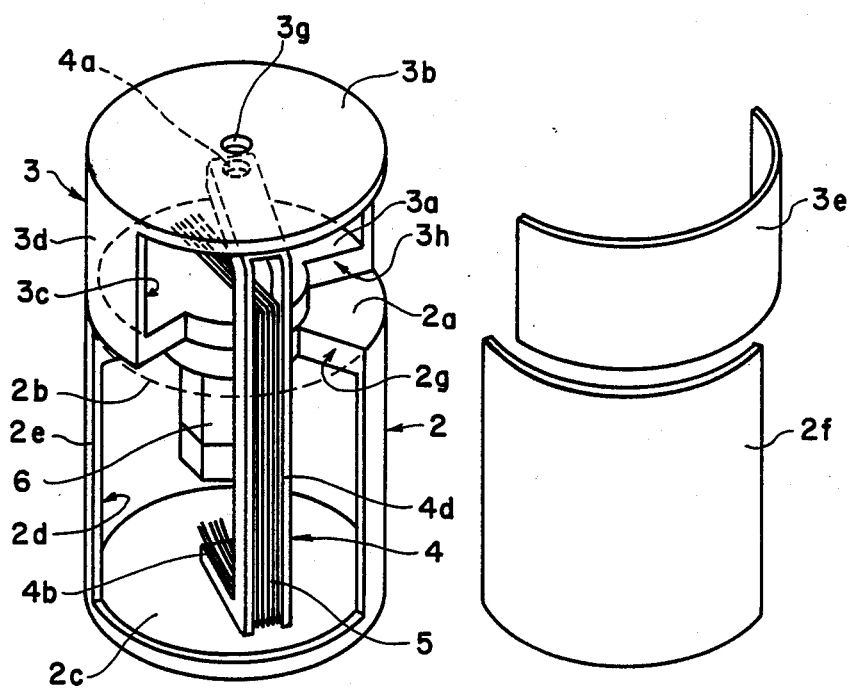
FIG. 1 is a perspective view showing an embodiment of a cable guiding apparatus for an industrial robot according to a preferred embodiment of the present invention.
Figure 4:
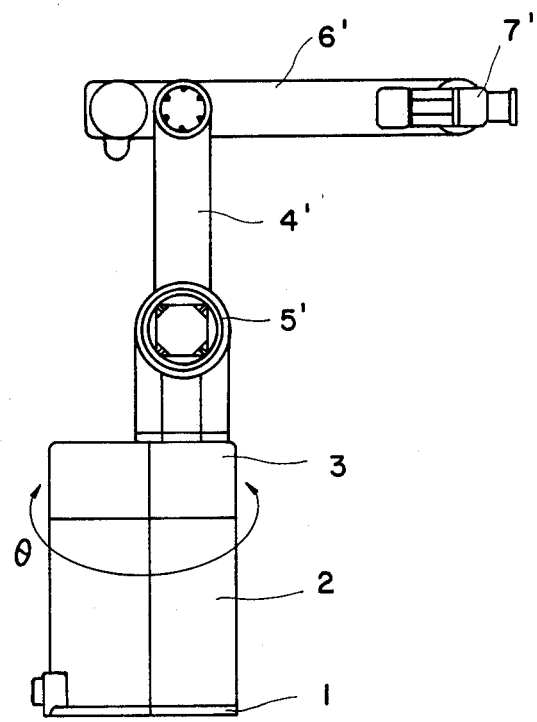
FIG. 4 is a side elevational view of an industrial robot.

FIG. 1 is a perspective view illustrating an embodiment of a cable guiding apparatus for an industrial robot according to the present invention. Those parts which are identical to those of FIG. 4 are denoted by identical reference numerals.

A hollow cylindrical support casing 2 which is mounted on a base (not shown) and fixed with respect to a central axis has an opening 29 defined in an upper wall 2a thereof, the opening 29 being of an arcuate shape of a certain angular range. The support casing 2 also has an arcuate opening 2d in a peripheral wall in an angular range corresponding to an arc 2b of the opening in the upper wall 2a and extending down to a lower wall 2c, thus providing an outer peripheral wall 2e having an opening 2d. The opening 2d is covered with a support casing cover 2f.

A swing casing 3 disposed upwardly of and in confronting relation to the upper wall 2a of the support casing 2 and movable with respect to the central axis has an opening 3h defined in a lower wall 3a thereof, the opening 3h being of an arcuate shape of an angular extent which is the same as that of the recess of the upper wall 2a of the support casing 2. The swing casing 3 has an arcuate opening 3c in a peripheral wall 3d having an angular range corresponding to the arc of the opening 3h of the lower wall 3a and extending up to an upper wall 3b. The swing casing 3 thus has an outer peripheral wall 3d having an opening 3c. A swing casing cover 3e covers the opening 3c. The covers 2f, 3e are detachably connected by means of tapping screws (not shown) to the support casing 2 and the swing casing 3, respectively, in covering relation to the openings 2d, 3c, and can be removed for maintenance, inspection, or the like.

Figure 3:
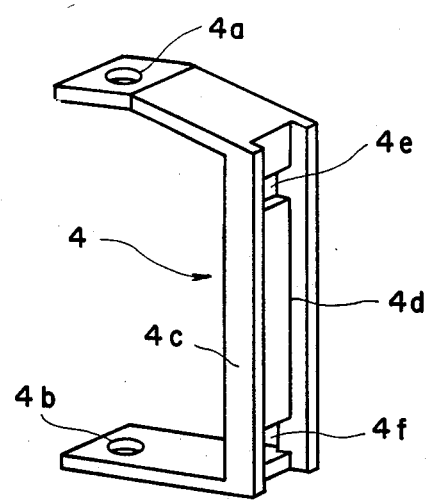
FIG. 3 is a perspective view of a cable guide employed in the embodiment of FIG. 1.

FIG. 3 is a perspective view of a cable guide 4. The cable guide 4 is of a modified C-shaped outer profile when viewed in side elevation and made of a bent metal sheet or molded synthetic resin. The cable guide 4 has shaft holes 4a, 4b near its upper and lower ends and includes a shank 4c of a channel-shaped cross section having a cable slot 4d defined in its outer surface. The shank 4c also has cable holes 4e, 4f near its upper and lower portions to provide a cable path between the inner side of the shank 4c and the cable slot 4d.

In FIG. 1, a pin 3g disposed centrally on the upper wall 3b of the swing casing 3 is loosely inserted in the upper shaft hole 4a of the cable guide 4, and a (not shown) disposed centrally on the lower wall 2c of the support casing 2 is loosely inserted in the lower shaft hole 4b of the cable guide 4. Therefore, the cable guide 4 is angularly movable about a straight line connecting the centers of the upper and lower shaft holes 4a, 4b, i.e., a swing shaft, in an opening having an arcuate horizontal cross section and defined between the support and swing casings 2, 3 in an area in which the opening 3h of the lower wall 3a of the swing casing 3 and the opening 2g of the supper wall 2a of the support casing 2 overlap each other.

Cables 5 are provided for transmitting electric power and signals from the support casing 2 to the swing casing 3, and extend from a position above the lower shaft hole 4b of the cable guide 4 through the lower cable hole 4f into the cable slot 4d, and then through the upper cable hole 4e over an upper surface of the lower wall 3a of the swing casing 3. A drive motor 6 for rotating the swing casing 3 is fixedly mounted on the upper wall 2a of the support casing 2.

Operation of the preferred embodiment thus constructed will be described below.

Figures 2A, 2B, 2C:
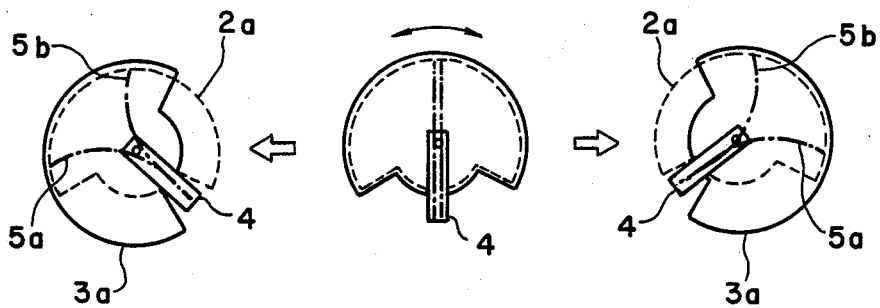
FIGS. 2A-2C are partial top views showing conditions of cables according to the embodiment of FIG. 1.

FIGS. 2A, 2B, and 2C are views showing conditions of the cables while the swing casing is in swinging movement. The positional relationship between upper ends 5a of cables 5 (indicated by the solid line in FIGS. 2A-2C) in the swing casing 3 and lower ends 5b of cables 5 (indicated by the dot-and-dash lines of FIGS. 2A-2C) in the support casing 2 is schematically shown as viewed from the swing casing 3.

FIG. 2B shows a condition in which the opening 3h of the lower wall 3a of the swing casing 3 and the opening 2g of the upper wall 2a of the support casing 2 are aligned with each other. In this condition, the ends 5a of cables and the lower cables ends of 5b of extend along a straight line without being substantially bent. When the swing casing 3 is turned from the position of FIG. 2B counterclockwise through 90°, for example, to the position of FIG. 2A, the cable guide 4 is turned counterclockwise through 45°, and the upper cables 5a inserted through the cable hole 4c into the swing casing 3 are curved into an arcuate shape having a large radius. The lower cables 5b from the lower cable hole 4f are also curved into an arcuate shape having a large radius.

When the swing casing 3 is turned clockwise from the position of FIG. 2B to the position of FIG. 2C, the cable guide 4 is slightly turned clockwise, so that the upper and lower ends 5a and 5b of cables 5 are curved into respective arcuate shapes each having a large radius.

In the conditions of FIGS. 2A and 2C, the upper and lower ends of cables are deformed to large curvatures which do not apply undue bending stresses to the cables themselves. By rounding the cable path ends of the cable slot 4d of the cable guide 4 where the cables 5 are drawn out, no undue forces are imposed on the cables when they are in sliding contact with the cable guide 4 at the time the cables 5 are deformed.

While the present invention has been described with reference to an embodiment thereof, many changes and modifications may be made therein without departing from the scope of the present invention. For example, the shapes of the spaces defined in the casings and the shape of the cable guide disposed therein may appropriately be changed.

According to the cable guiding apparatus for an industrial robot of the present invention, an upper end portion of a substantially C-shaped cable guide is pivotally supported on a swing casing at the central axis of a swing shaft, and a lower end portion of the cable guide is pivotally supported on a support casing at the central axis of the swing shaft, and openings for allowing the cable guide to be freely swingable therein are defined in the swing casing and the support casing, respectively. Therefore, when the swing casing swings, the cable guide is swung in the spaces according to stresses applied to cables, and the stresses are not born by a localized portion of the cables themselves, but are distributed widely over the cables. The cables are not subjected to undue bending stresses, and have a long service life. The portion of the cables which is largely moved upon swinging movement of the swing casing is held in position by the cable guide, so that sliding contact between the cable surfaces and the inner surfaces of the casings is reduced and the cables are prevented from being damaged.

What is claimed is:

1. A cable guiding apparatus for an industrial robot, for guiding cables interconnecting a swing shaft swingable through a prescribed angle and a support supporting the swing shaft, comprising:
   a stationary cylindrical support casing;
   a rotatable swing casing rotatably supported on said support casing;
   a cable guide, movable by abutment with the swing casing for moving and guiding the cables and having one end pivotally supported on said swing casing coaxial with said swing shaft and an opposite end pivotally supported in said support casing coaxial with said swing shaft; and
   openings provided in said swing casing and said support casing, respectively, for allowing said cable guide to swing therein through a prescribed angle.

2. A cable guiding apparatus according to claim 1, wherein said swing casing is rotatably supported on top of said support casing.

3. A cable guiding apparatus according to claim 1, wherein said cable guide has opposite ends and an opening provided near each opposite end through which said cables extend, the ends being rounded.

4. A cable guiding apparatus according to claim 1, wherein said swing casing and said support casing define an angle through which said cable guide is swung in said openings.

5. A cable guiding apparatus according to claim 1, wherein said cylindrical support casing has a peripheral wall, a lower wall, and an upper wall, and wherein the upper wall has an arcuate opening of a predetermined arc length for allowing said cable guide to swing therein through a prescribed angle.

6. A cable guiding apparatus according to claim 5, wherein the peripheral wall has an arcuate opening of a predetermined arc length which is the same arc length as that of the upper wall arcuate opening, the upper wall arcuate opening and the peripheral wall arcuate opening of the support casing defining a single opening within which the cable guide is movable.

7. A cable guiding apparatus according to claim 6, wherein the swing casing includes a peripheral wall, a lower wall, and an upper wall, the lower wall having an arcuate opening of a predetermined arc length for allowing said cable guide to swing therein through a prescribed angle.

8. A cable guiding apparatus according to claim 7, wherein the peripheral wall of the swing casing has an arcuate opening of a predetermined arc length which is the same arc length as that of the swing casing lower wall arcuate opening.

9. A cable guiding apparatus according to claim 1, wherein said cable guide is movable with the swing casing when in abutment with the swing casing.

10. A cable guiding apparatus according to claim 1, wherein said cable guide is substantially C-shaped.

11. A cable guiding apparatus for an industrial robot, for guiding cables interconnecting two members rotatable relative to each other through a prescribed angle, comprising:
- a stationary cylindrical support casing having a peripheral wall, a lower wall, and an upper wall;
- a rotatable swing casing having a peripheral wall, a lower wall, and an upper wall and being rotatably supported on said support casing;
- a cable guide, movable by abutment with the swing casing, for moving and guiding the cables and having one end pivotably supported on said swing casing coaxial with said swing shaft;
- the lower wall of the swing casing and the upper wall of the support casing each having an arcuate opening of a predetermined arc length for allowing said cable guide to swing therein through a prescribed angle, said arcuate opening in the lower wall of said swing casing having opposite sides which abut the cable guide for a portion of the prescribed angle of swing.

* * * * *

UNITED STATES PATENT AND TRADEMARK OFFICE
CERTIFICATE OF CORRECTION

PATENT NO. : 4,906,121

DATED : March 6, 1990

INVENTOR(S) : N. Torii et al..

It is certified that error appears in the above-identified patent and that said Letters Patent is hereby corrected as shown below:

Front Page [13] Assignee "Yamanashi" should be --Minamitsuru--.

Col. 1, line 27, "(2)" should be --(θ)--;
line 54, "resuling" should be --resulting--.

Col. 2, line 43, "29" should be --2g--;
line 44, "29" should be --2g--.

Col. 3, line 15, "a (not" should be --a pin (not--;
line 50, "cables and the lower cables ends of 5b of extend" should be --cables 5 and the lower ends of 5b of cables 5 extend--.

Signed and Sealed this

Sixteenth Day of April, 1991

Attest:

HARRY F. MANBECK, JR.

Attesting Officer

Commissioner of Patents and Trademarks